United States Patent [19]

Malatesta

[11] 4,242,244
[45] Dec. 30, 1980

[54] RESINS FOR PRINTING INKS

[75] Inventor: Alberto Malatesta, Brussels, Belgium

[73] Assignee: Exxon Research & Engineering Co., Florham Park, N.J.

[21] Appl. No.: 22,080

[22] Filed: Mar. 19, 1979

[30] Foreign Application Priority Data

Mar. 22, 1978 [GB] United Kingdom ............... 11407/78
Oct. 24, 1978 [GB] United Kingdom ............... 41740/78

[51] Int. Cl.³ .................... C08F 279/02; C09D 3/733; C09D 11/10
[52] U.S. Cl. ................ 260/23.7 C; 106/27; 106/32; 260/DIG. 38; 526/308
[58] Field of Search .............. 260/23.7 C, DIG. 38; 106/27, 32; 526/308

[56] References Cited

U.S. PATENT DOCUMENTS

| | | | |
|---|---|---|---|
| 3,984,381 | 10/1976 | Tsuchiya et al. ...................... | 106/27 |
| 4,002,585 | 1/1977 | Oishi et al. ............................. | 260/25 |
| 4,028,291 | 6/1977 | Tsuchiya et al. ............... | 260/23.7 C |
| 4,048,132 | 9/1977 | Tsuchiya et al. .................... | 526/308 |
| 4,056,498 | 11/1977 | Laurito ........................... | 260/23.7 C |
| 4,087,483 | 5/1978 | Geerdes ................................ | 106/20 |

FOREIGN PATENT DOCUMENTS

1369370 10/1974 United Kingdom .
1379037 1/1975 United Kingdom .
1,437,966 6/1976 United Kingdom .
1,492,701 11/1977 United Kingdom .

*Primary Examiner*—Ronald W. Griffin
*Attorney, Agent, or Firm*—Rebecca Yablonsky

[57] ABSTRACT

A carboxyl modified, metal-free petroleum resin comprising a resin obtained by thermal polymerization of a feed containing cyclopentadiene and/or methylcyclopentadiene and/or their dimers or codimers having been reacted electrophilically with a saturated or ethylenically unsaturated higher fatty acid, said modified resin having an acid number less than 20, containing from 1 wt. % to 5 wt. % of oxygen and having a softening point of from 120° C. to 200° C.

These resins may be prepared by heating a resin obtained by thermal polymerization of a feed containing the aforesaid cyclopentadiene and/or methylcyclopentadiene and/or derivatives thereof with said carboxylic acid to a temperature in the range of 200° C. to 270° C. and subsequently removing free acid to reduce the acid number to below 20.

These resins may be used for offset printing inks, and suitable printing ink compositions comprise (a) 5 to 30% by weight of such a resin (b) 5 to 30% by weight of a drying oil, (c) 20 to 40% by weight of a pigment, (d) 0 to 10% by weight of an assistant, and (e) a solvent being the balance, the weight percentages of components (a), (b), (c) and (d) being based on the total weight of the composition.

20 Claims, No Drawings

RESINS FOR PRINTING INKS

The present invention relates to a modified petroleum resin suitable for use as a printing ink resin especially for offset printing, to printing inks containing the modified petroleum resin and to processes for the production of the modified resins. Petroleum resins may be obtained by Friedel-Crafts or thermal polymerisation of feeds obtained from petroleum refining. It has been proposed that both types of resin may be used as raw materials for the production of printing ink resins. In all instances the resin is modified for use in the inks and we are concerned with resins obtained by thermal polymerisation since they generally have a higher degree of unsaturation.

It has been proposed and is common practice to use modified thermally polymerised petroleum resins as printing ink resins in rotogravure printing inks. For example United Kingdom Pat. No. 1,369,370 describes the preparation of such a modified resin and the properties that are required of a resin to be suitable for rotogravure inks. As mentioned in U.K. Pat. No. 1,369,370 the ink resins should be soluble in solvents such as toluene to give solutions of viscosity from 100 to 500 centipoise. The requirements for offset printing inks are different in that offset inks use much higher boiling solvents and viscosities up to around 300 poise or higher are required.

The offset process is also very different from the rotogravure process and in the offset process certain areas of the printing plate are made receptive to the printing ink and certain parts receptive to water. In the printing process the plate is first coated with water so that water is retained only by those areas receptive to water and then coated with ink so that ink is retained only on those parts of the plate receptive to ink.

The printing plate therefore contains areas of ink adjacent areas of water and for good printing it is important that the boundary between the two areas is clearly defined and that neither water nor ink will migrate across the boundary since this will smudge the print. The modified petroleum resins that have hitherto been proposed as ink resins for rotogravure printing are modified with polar compounds, frequently carboxylic acids and anhydrides, and will contain a significant amount of free carboxyl or anhydride groups some of which as in U.K. Pat. No. 1,369,370 may be neutralised with meal salts. In all these techniques however the presence of the free polar groups or the metal cation renders the resin and thus the printing ink hydrophilic and thus unsuitable for use in offset printing.

United Kingdom patent specification No. 1,379,037 and Netherlands patent application No. 7514901 describe resins which may be used as binders in offset printing ink. Both techniques require the esterification of carboxyl modified resins which is not only a further expensive operation but in some instances does not yield a resin satisfactory for use in offset printing inks. The process of Netherlands patent application No. 7514901 which uses a mixture of acids and esterification with a polyol is complicated and expensive.

United Kingdom patent specifications Nos. 1,379,037, 1,437,966 and 1,492,701 and U.S. Pat. Nos. 3,984,381 and 4,002,585 and Dutch application No. 7514901 also relate to producing ink resins for offset printing by carboxyl groups. In these techniques at least some of the acid which is reacted with the resin contains unsaturation is an $\alpha,\beta$ unsaturated acid leading to an "ene" reaction and carboxyl groups in the treated resin are neutralised before the resin is used as an ink resin.

We have now found that a resin satisfactory for use in offset printing may be obtained by electrophilic carboxyl modification of a petroleum resin without the need for a subsequent reaction of the modified resin.

The present invention therefore provides a carboxyl modified metal-free petroleum resin comprising a resin obtained by thermal polymerisation of a feed containing cyclopentadiene and/or methylcyclopentadiene and/or derivatives thereof, said resin having an acid number less than 10, containing from 1 wt.% to 5 wt.% of oxygen and a softening point from 120° C. to 200° C.

We have found that the resins of the present invention are particularly useful for ink resins for offset printing inks. The carboxyl modification of the resin insures good retention of the pigment whilst the low carboxyl number and absence of metallic cations renders the resin hydrophobic. The resins are also soluble in the petroleum distillate solvents frequently used in offset printing inks to give solutions of the desired viscosity. The term carboxyl modified refers to reaction of the resin with carboxyl containing compounds but does not require that the modified resin contain free carboxylate groups.

The petroleum resin from which the modified resins of the present invention are derived is obtained by thermal polymerisation of feeds containing dicyclopentadiene, methyldicyclopentadiene, cyclopentadiene, methycyclopentadienes, cyclopentadiene-methylcyclopentadiene codimers. Generally the thermal polymerisation is carried out at a temperature from 150° C. to 300° C. and the feed generally has a concentration of from 10 to 90 wt. %, preferably 40 to 80 wt. % of unsaturated components of which preferably from 50 to 95 wt.% are cyclopentadiene derivatives. Other hydrocarbons such as the unsaturated polymerisable aromatics, styrene, vinyltoluene, indene and methylindene may be added to the feed to the thermal polymerisation. The presence of the aromatic component in the resin improves the wetting power in use in the ink and we prefer to include from 1 to 50 wt. % preferably 10 to 30 wt. % of the unsaturated aromatic based on the total weight of the feed.

The resins obtained by such thermal polymerisation are believed to contain two types of olefinic unsaturation, the amount of unsaturation depending to some extent on the aromatic content of the feed. The resins contain the more reactive bicycloheptene unsaturation as well as the less reactive cyclopentene unsaturation. We have found that for the resin to be capable of electrophilic carboxyl modification to yield the modified resins for offset printing it should contain at least 0.1 double bonds per 100 grams of resin and preferably 0.1 to 1.5 more preferably 0.5—1.5 double bonds per 100 grams of resin as determined by Nuclear Magnetic Resonance Spectroscopy. These resins generally have a Bromine number from 60 to 100.

The resins prepared by this thermal polymerisation generally have a low softening point of 90°–120° C. due to the presence of low molecular weight oligomers and unpolymerised monomers. It is therefore preferred to heat soak the resin at a temperature in the range 200° C. to 270° C. for from 4 to 8 hours following the thermal polymerisation to increase the softening point to within the range of 140° to 210° C.

The unsaturated sites in the resin, especially the bicycloheptene double bond are readily protonated by acids such as carboxylic acids with further addition of the carboxylate anion to provide the carboxyl modified resins as follows:

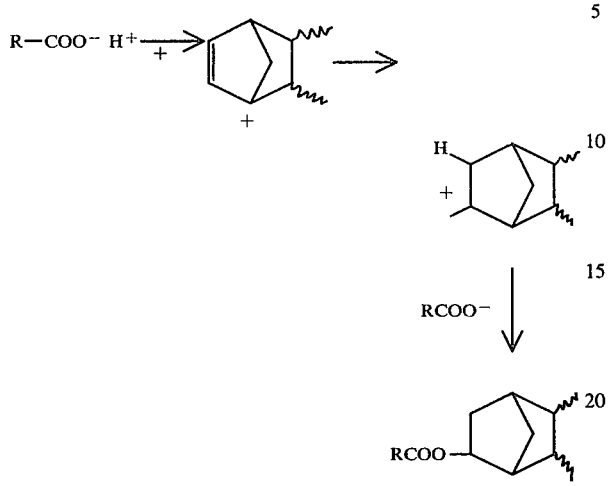

thus resulting in ester group formation.

The electrophilic carboxyl modification may be achieved with unsaturated or saturated mono- or polycarboxylic acids but where an ethylenically unsaturated acid is used the unsaturation should not be $\alpha,\beta$ to an activating oxygen function, such as a carboxyl or anhydride group, since these tend to undergo ene addition reactions with the bicycloheptene double bonds rather than the protonation reaction to produce the compounds of this invention, thus maleic and fumaric acids and anhydrides are not suitable. Use of unsaturated acids however allows control of the amount of unsaturation present in the resin which is especially useful when the resins are used in what are known as quickset inks where the ink is dried very rapidly after printing by air oxidation of the unsaturation in the resin generally using a drying catalyst such as cobalt naphthenate. Mixtures of saturated and unsaturated acids may be used to control the drying and also to give resins of the desired viscosity and softening point. Our preferred acids are the synthetic saturated or unsaturated fatty acids such as the $C_7$ and higher neo acids and myristic, palmitic, stearic, oleic, linoleic and linolenic acids and the naturally occuring acids such as tall oil acids, linseed oil acids, fish oil acids and safflower oil acids.

The conditions that should be used in the reaction of the carboxylic acid and the resin depend upon the particular carboxylic acid being used. We prefer when using the vegetable fatty acids to heat the resin with the acid at a temperature in the range 200° C. to 270° C. preferably 200° C. to 250° C. from 3 hours to 7 hours, preferably 5 to 7 hours. If however lower molecular weight acids such as the $C_7$ and $C_{10}$ acids are used then lower temperatures and shorter times may be used.

We have found that for the modified resin to act in offset printing it should contain sufficient combined acid to have an oxygen content of at least 1 wt. % and up to 5 wt. %. Most preferably the modified resin contains from 1 wt.% to 3 wt.% oxygen.

Generally we react the resin with from 25 wt.% to 50 wt.% based on the weight of the resin of the carboxylic acid and we find that about 10% to 35% of the acid reacts which generally gives a resin with an acid number in the range 30 to 45 and not optimally suitable as an offset printing ink. Thus, where the modified resin has such a high acid number, free acid is removed, preferably by vacuum distillation, to reduce the acid number to below 20, preferably below 10. We prefer that the modified resin have an acid number from 5 to 10 since this gives sufficient polarity to wet the pigment whilst ensuring that the ink remains hydrophobic.

The present invention therefore also provides a process for the production of a carboxyl modified resin comprising heating a resin obtained by thermal polymerisation of a feed containing cyclopentadiene and/or methylcyclopentadiene and/or derivatives thereof with a carboxylic acid other than an $\alpha,\beta$ unsaturated carboxylic acid to a temperature in the range of 200° C. to 270° C. and subsequently removing free acid to reduce the acid number to below 20.

The conditions that should be used to remove any free acid depend upon the nature of the acid. However, when using the naturally occuring acids we find that the acid may conveniently be removed by heating at a temperature of 200° C. to 250° C. at 2 to 5 millimetre mercury pressure until the required acid number is achieved. Lower temperatures between 160° and 200° C. at the same vacuum are used for lower molecular weight acids.

We have also found that resins having the desired acid number and softening point may be obtained by reducing the amount of acid reacted with the resin and prolonging the heating so that removal of unreacted acid by subsequent vacuum distillation may be avoided. In this embodiment of the invention we prefer to react from 1 to 15 wt percent of the acid with the resin, preferably from 5 to 12 wt percent based on the weight of the resin. The resin and the acid are heated together preferably at a temperature in the range 200° to 280° C. more preferably 220° to 260° C. for at least 5, preferably from 5 to 24, more preferably 10 to 18 hours.

Printing inks using the resins of this invention can be prepared by any customary method.

For example, an ink vehicle of the following formulation is first prepared.

Composition of the ink vehicle.

| Resin | 5 to 80, preferably 10 to 50 |
| Drying Oil | 0 to 100, preferably 10 to 50 |
| Assistant | 0 to 10, preferably 1 to 5 |
| Solvent | Balance, preferably 70 to 150 |
| Total | (parts by weight) |

100 parts by weight

These ingredients were dissolved at room temperature or at an elevated temperature (200° to 300° C.). The resin may be the resin of this invention alone or in combination with other natural or synthetic resins. The drying oil is generally linseed oil, tung oil or dehydrated castor oil. The assistant may, for example, be added to improve processability (by adjusting viscosity, elasticity or plasticity of an ink), dryability (to improve the drying of oily inks or to prevent skinning or thickening) or finish (for example to prevent blocking, to improve scratch resistance or to adjust colour density). Examples of suitable assistants are aluminum stearate and organic bentonite. The solvent is typically a hydrocarbon petroleum distillate containing $C_{12}$—$C_{16}$ hydrocarbons boiling in the range 210°-330° C.

The ink vehicle so prepared is mixed with a pigment in a mixer, and then, the pre-mix may be further kneaded using such a device as roll mill, sand mill, attriter or colloid mill. Any of the conventional pigments may be used. An assistant and a solvent are added to the kneaded mixture and they are mixed in a mixer or roll mill. Typical recipes for ink preparation are as follows:

| Ink vehicle | 40 to 80, preferably 50 to 60 |
| Pigment | 10 to 60, preferably 20 to 40 |
| Assistant | 0 to 15, preferably 1 to 10 |
| Solvent | Balance |
| Total | |

100 parts by weight.

Examples of the assistant are processability adjuster (e.g. high viscosity varnish, gel varnish or diluted varnish), dryability adjuster (e.g. a dryer or inhibitor) or usability adjuster (e.g. scratch-proof waxes).

Thus according to another aspect of this invention, there is provided a printing ink composition comprising (a) 5 to 30% by weight of a resin according to the invention, (b) 5 to 30% by weight of a drying oil, (c) 20 to 40% by weight of a pigment, (d) 0 to 10% by weight of an assistant and (e) a solvent being the balance, the proportions of components (a), (b), (c), (d) and (e) being based on the total weight of the composition.

The present invention is illustrated but in no way limited by reference to the following examples.

EXAMPLE 1

1500 g of a petroleum resin obtained by thermal polymerisation of a concentrated cyclopentadiene feed commercially available as "Escorez" 8000 having a softening point (Ring and Ball) 90°–100° C. and from 0.6 to 0.8 double bonds per 100 grams of resin as measured with a 90 megahertz Nuclear Magnetic Resonance Spectrometer and a Bromine Number of 60 to 70 are introduced in a nitrogen-filled resin kettle fitted with a stirrer, a thermometer and a reflux condenser. The resin is melted under nitrogen and stirring and it is heated at 250° C. for a variable amount of time. During the first four hours of heating low boiling hydrocarbons (mostly cyclopentadiene, methylcyclopentadienes isomers and their dimers and codimers) are formed by thermal decomposition of the resin. They are all refluxed back into the kettle until after the first four hours of heating their amount decreases and eventually stops.

During this heating the softening point of the resin increases and the bicycloheptene content decreases compared to the cyclopentene double bond content, the molecular weight ($\overline{Mn}$) and viscosity increase.

The effect of heating is summarised below.

| Hours of heating at 250° C. | Softening Point (Cap) °C. | $\overline{Mn}$ | % bicycloheptene on total unsaturation |
|---|---|---|---|
| 0 | 95 | 550 | 26 |
| 4 | 118 | 665 | 26 |
| 5 | 145 | 755 | 24 |
| 6 | 155 | 815 | 24 |
| 7 | 172 | 850 | 25 |
| 8 | 180 | 880 | 22 |
| 9 | 190 | — | — |
| 10 | 200 | 970 | 18 |
| 11 | 210 | 1010 | 18 |

420 g of tall oil fatty acids: (oleic acid 46%, linoleic acid 45%, linolenic acid 4.5%, acids not identified 4.5%. (by Gas chromatography) Iodine Number 134, peroxide 130 ppm, Acid Number 197) are added at 250° C. to the resin that has been heated at 250° C. for 7 hours and heated for a further four hours. The Acid Number of the resin obtained is in the range 30–40 and the resin is unsuitable as an offset printing ink resin.

The resin obtained contains an unreacted amount of fatty acids in the range of 60–90% of the starting acid. The resin is vacuum distilled up to a temperature of 250° C. and at a pressure of 2–5 mm Hg. The recovered resin has a final softening point which is in relation to the softening point of the preheated resin which is reacted with the acid and also the extent of the excess acid vacuum stripping. Acid numbers of the final resin are in the range 10–20, Iodine numbers 150–170, Color Gardner (50/50 wt. in toluene) 10–14.

| Resin No. | Softening points °C. (capillary) Preheated resin | Final resin | Acid Number | Iodine N° | Color Gardner |
|---|---|---|---|---|---|
| 1 | 158 | 164 | 10 | 160 | 12 |
| 2 | 165 | 153 | 12.5 | — | 13 |
| 3 | 174 | 168 | 10 | 166 | 13 |
| 4 | 179 | 174 | 13 | 160 | 12 |
| 5 | 185 | 182 | 9.5 | 159 | 13 |
| 6 | 188 | 174 | 17 | — | 12 |
| 7 | 190 | 174 | 17 | — | 13 |

All the ink resins described above had an oxygen content in the range 1.7–2.5 wt.% as determined by micro-analysis and were found to be useful as offset printing ink resins.

The resins were soluble (10% solution) in the ink oils used for offset printing such as the hydrocarbon petroleum distillates with carbon numbers in the range $C_{12}$—$C_{16}$ and boiling points depending on enduse (offset heat-set quick set) in the range 210°–330° C., for example 240° C. to 320° C.

46 parts by weight of Resin 6 were placed in a varnish ink kettle, fitted with a high shear stirrer, together with 36 parts of an ink solvent of boiling point 230°–260° C. containing about 2% aromatic hydrocarbons. As the temperature increased to 110°–120° C. due to the action of the stirrer, 12 parts by weight of 1.08 poise linseed oil were added to the mixture together with 6 parts of ink solvents. After cooling at room temperature 62 parts by weight of the varnish prepared were mixed under shear conditions with 20 parts of carbon black, 8 parts of wax, 6 parts of the ink solvent and 2 parts of tridecyl alcohol. The ink had the following properties:

| Viscosity Haake 23° C. 120p | |
|---|---|
| Printability IGT test | |
| Initial setting | 4 |
| Final setting | 3.5 |
| Plucking | 5 |
| Gloss | 4 |
| Uniformity | 4.5 |
| Intensity | 4.5 |
| Misting | 3.5 |

These values being readings on a scale in which 0 represents poor and 5 represents excellent.

EXAMPLE 2

Linseed oil fatty acid was heated for 5 hours at 250° C. and then ½ mole of the acid was mixed with one mole of the heat-treated petroleum resin used in Example 1 and heating continued for a further 4 hours.

Following this the product was distilled at 250° C. under vacuum (2 millimetres of mercury) to give a final product having an acid number of 12, an Iodine number of 150, a capillary melting point of 150° C. and an oxygen content of about 2 wt%. About 30% of the acid charge had reacted with the resin.

The acid treated resin was soluble in ink oils used for offset printing and was useful in offset printing.

EXAMPLE 3

1500 Grams of the resin used in Example 1 were heated to 200° C. and mixed with 420 grams of neodecanoic acid (2 moles of resin per mole of acid). The temperature was raised slowly to 250° C. avoiding foam formation and refluxed for 4 hours under nitrogen. The product was distilled under vacuum to give a final resin of total acid number 1 a capillary melting point of 127° C. and an oxygen content of about 2 wt%. About 50% of the acid had reacted with the resin.

EXAMPLE 4

The process of Example 3 was repeated to give a higher melting resin. 1600 grams of the resin were heated at 250° C. for 7 hours and 448 grams of neodecanoic acid added and heated for a further 4 hours at 250° C. The mixture was then distilled at 250° C. and 2 millimetres of mercury pressure to give a material of acid number 3-4, Iodine number 156, melting point 170°-180° C. and an oxygen content of about 1.8 wt%. About 20 wt.% of the acid had reacted with the resin.

The product was very suitable as a resin for offset printing inks.

EXAMPLE 5

600 Grams of the resin used in Example 1 were heated for 5 hours at 250° C., 170 grams of stearic acid were added and the mixture was heated for a further 4 to 5 hours at 250° C. and then distilled at 250° C. under 2 millimetres of mercury pressure.

The resin had an acid number of 9, an iodine number of 138, a capillary melting point of 160° C., and an oxygen content of about 2 wt%. About 37% of the acid had reacted with the resin.

The product was very suitable as a resin for offset printing inks.

EXAMPLE 6

1000 Grams of the resin used in Example 1 was mixed at room temperature with 120 grams of tall oil fatty acid using the equipment described in Example 1. The temperature was then raised to 250° C. and held at that temperature whilst stirring for 14 hours.

The resin obtained had an acid number of 5, an iodine number of 162, a capillary melting point of 135° C., a Gardner Colour of 10-11 and an oxygen content of about 1.22 wt%. The resin had perfect solubility in the ink solvent and performed well in offset printing.

EXAMPLE 7

For the sake of comparison a modified resin was prepared according to the process of Example 1 of United Kingdom Pat. No. 1,369,370 except that the starting resin was that used in Example 1 of this application.

After reaction with magnesium oxide the resin was found to have an Acid No. of 9 but when it was tested in the oil formulation used in Example 1 of this application the Initial Setting, Plucking, Uniformity and Intensity of the ink were found to be unsatisfactory.

I claim:

1. A carboxyl modified metal-free petroleum resin comprising a resin obtained by thermal polymerisation of a feed containing cyclopentadiene and/or methylcyclopentadiene and/or the dimers or codimers thereof having been reacted electrophilically with a saturated or ethylenically unsaturated $C_7$ or higher fatty acid, said modified resin having an acid number less than 20, containing from 1 wt.% to 5 wt.% of oxygen and having a softening point of from 120° C. to 200° C.

2. A carboxyl modified resin according to claim 1 in which the resin is obtained by thermal polymerisation of a feed containing from 1 to 50 wt.% unsaturated polymerisable aromatics.

3. A carboxyl modified resin according to claim 2 in which the feed contains 10 to 30 wt.% of unsaturated polymerisable aromatics.

4. A carboxyl modified resin according to claim 1 or 2 in which the resin has been heated at a temperature in the range 200° C. to 270° C. for from 4 to 8 hours following thermal polymerisation.

5. A carboxyl modified resin according to claim 1 or 2 in which the resin contains 0.1 to 1.5 double bonds per 100 grams of resin as determined by Nuclear Magnetic Resonance.

6. A carboxyl modified resin according to claim 1 or 2 in which the resin has a Bromine number from 60 to 100.

7. A carboxyl modified resin according to claim 1 or 2 wherein the oxygen content is from 1 wt.% to 3 wt.%.

8. A carboxyl modified resin according to claim 1 having an acid number of 5 to 10.

9. A process for the production of a carboxyl modified resin comprising heating a resin obtained by thermal polymerisation of a feed containing cyclopentadiene and/or methylcyclopentadiene and/or the dimers or codimers thereof with a saturated or ethylenically unsaturated $C_7$ or higher fatty acid to a temperature in the range of 200° C. to 270° C. and subsequently removing free acid to reduce the acid number to below 20.

10. A process according to claim 9 in which from 25 wt.% to 50 wt.% of fatty acid based on the weight of the resin is used.

11. A process according to claim 9 or claim 10 in which the resin and the acid are heated for from 3 to 7 hours.

12. A process according to claim 9 in which the free acid is removed by heating at 200° C. to 250° C. at 2 to 5 millimetres pressure.

13. A process for the production of a carboxyl modified resin comprising heating a resin obtained by thermal polymerisation of a feed containing cyclopentadiene and/or methyl cyclopentadiene and/or the dimers or codimers thereof with from 1 to 15 wt percent on the weight of the resin of a saturated or ethylenically unsaturated $C_7$ or higher fatty acid at a temperature in the range of 200° to 280° C. for at least 5 hours.

14. A process according to claim 13 in which the resin and the acid are heated together for from 5 to 24 hours.

15. A process according to claim 9 or 13 in which the resin has been prepared by thermal polymerisation of a feed containing 10 to 90 wt.% of unsaturates of which 50 to 95 wt.% are cyclopentadiene and/or methylcyclopentadiene and/or the dimers or codimers thereof.

16. A process according to claim 9 or 13 in which the resin contains from 0.1 to 1.5 double bonds per 100 grams of the resin.

17. A process according to claim 9 or 13 in which the resin has a softening point in the range of 140° to 210° C.

18. Carboxyl modified petroleum resins whenever prepared by a process according to claim 9 or 13.

19. An ink for use in offset printing containing as a binder a carboxyl modified resin according to claim 1 or 8.

20. A printing ink composition comprising (a) 5 to 30% by weight of a resin as claimed in claim 1 or 8 (b) 5 to 30% by weight of a drying oil, (c) 20 to 40% by weight of a pigment, (d) 0 to 10% by weight of an assistant, and (e) a solvent being the balance, the weight percentages of components (a), (b), (c) and (d) being based on the total weight of the composition.

* * * * *